3,253,119
ELECTRIC ARC WORKING
August F. Manz, Newark, N.J., assignor to Union Carbide Corporation, a corporation of New York
Filed Aug. 10, 1964, Ser. No. 388,583
6 Claims. (Cl. 219—135)

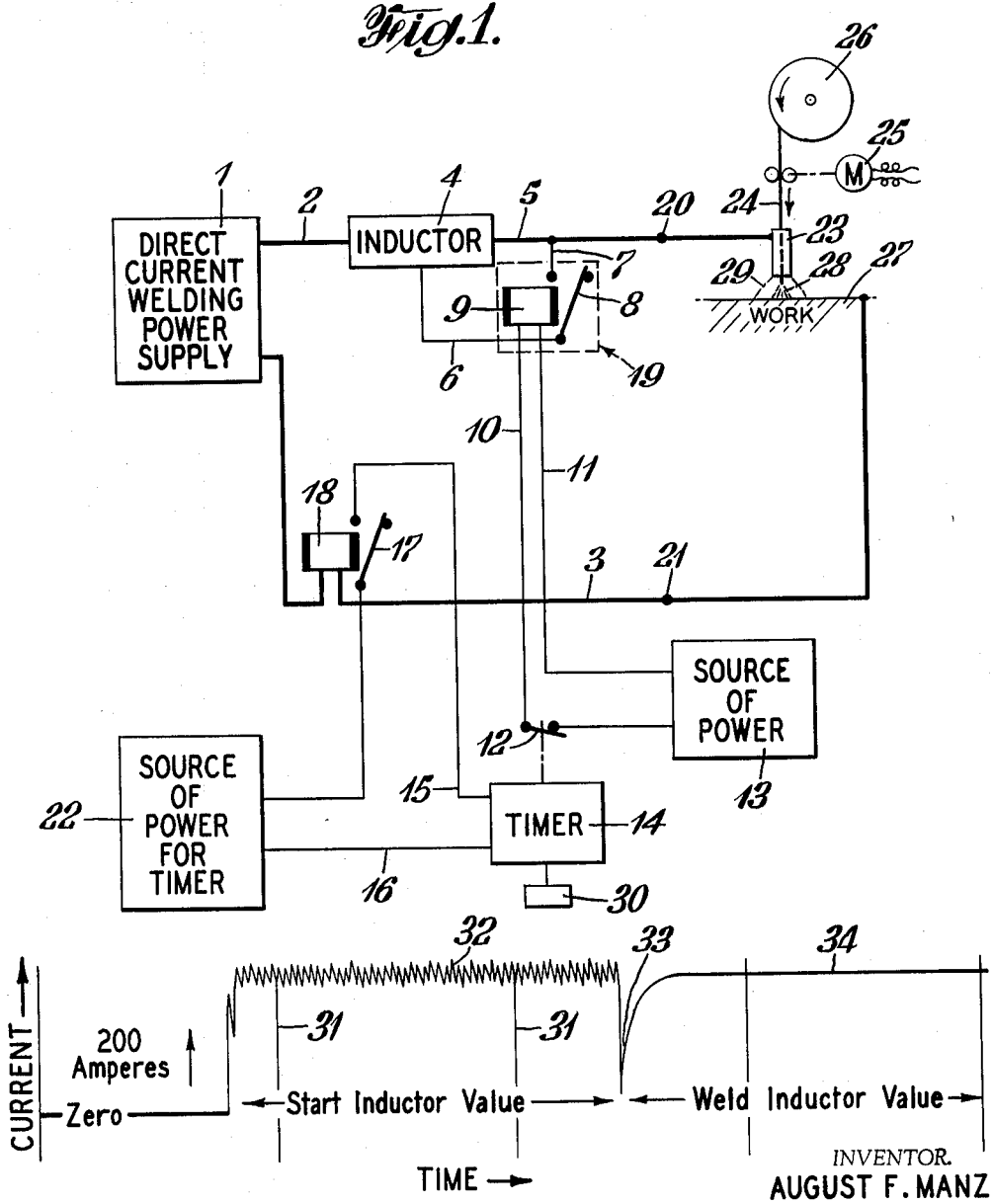

This invention relates to arc working and more particularly to work-in-circuit arc welding.

According to the invention there is provided a direct current metal arc power supply system provided with means acting to control a timing interval in response to the flow of current, and circuit means acting to change from an arc starting value of rate of current rise to a metal transfer value of rate of current rise upon completion of said timing interval.

More particularly the invention provides an electric arc working system comprising the combination of means for feeding a consumable metal electrode toward a workpiece, and means for energizing a direct current arc between the end of such electrode and the workpiece in a series circuit. Such arc energizing means includes an inductor in series with the arc for stabilizing the transfer of molten metal from the end of such electrode as the electrode is fed toward the workpiece. Connected to such inductor is a novel circuit provided with means for selectively changing the inductance in the arc circuit from an optimum arc starting value to the metal transfer stabilizing value after a suitable time interval, in response to the initial flow of current in the arc circuit.

Many direct current welding systems require the use of inductance in the weld circuit in order to make good welds. One example is when welding stainless steel with helium-carbon dioxide-argon mixtures and short-circuiting metal transfer. A relatively large amount of inductance is necessary in such case to provide stable metal transfer with low weld spatter. The value of inductance required for stable metal transfer, however, is often too large for good arc starting characteristics.

The arc start inductance value in many cases should be less than the metal transfer stabilizing inductance value. When commercially available power sources with inductance in the weld circuit have to be adjusted to provide good starting characteristics in many cases optimum metal transfer stability is sacrificed. When the power source is set to provide optimum weld transfer stability in most cases the starting characteristics are not optimum. In addition, when the starting current is as low as practical, the required metal transfer stabilizing inductance prevents an arc from being started at all to avoid objectionable spatter.

The purpose of this invention is to provide an electric arc working system that effectively solves such problem by the use of different starting and working values of inductance to promote good starts with a minimum of objectionable spatter and optimum metal transfer stability.

According to the invention, the arc is started with an inductor in series with the circuit for energizing such arc, having an inductance value that results in good starting characteristics. Then, as soon as such arc start is accomplished, the value of inductance in such circuit is changed to one that is more suitable for operation of the arc. The direct current power supply system of the invention is provided with a timing circuit to operate a switch which selectively changes the inductance in the arc circuit from a relatively low value to a relatively high value of added series inductance after a preset interval of time.

In the drawing:

FIGURE 1 is a circuit diagram of a working example of the invention; and

FIGURE 2 is an oscillogram of current of a resistive load test of the inventive circuit.

A direct current welding power supply 1 is connected by leads 2 and 3 to terminals 20 and 21 of a consumable metal arc welding set-up comprising a wire contact-guide tube 23 through which an electrode 24 is fed by a motor 25 from a reel 26. The electrode is directed toward work 27, so that an arc 28 is energized between the end of the electrode and such work as metal is transferred from the electrode in a gas stream 29.

In lead 2, an inductor 4 is provided with a high inductance output lead 5 that is connected directly to terminal 20, and with a low inductance output lead 6 that is connected through shunt relay 19 contacts 8 to terminal 20 by lead 7. The contacts 8 are normally open (during welding) being closed by coil 9 which is connected by a circuit including leads 10 and 11 through switch 12 to a source of power 13. Switch 12 is normally closed, being moved to the open position by a timer 14 having timing interval adjusting means 30. Timer 14 is connected by wires 15 and 16 to a source of power 22 by normally open current relay contacts 17. The contacts 17 are operated by a current relay 18 in the output circuit of the power source 1.

Initially shunt relay 19 has its contacts 18 closed, because contacts 17 of current relay 18 are open, thereby allowing the timer contacts 12 to remain closed, and relay coil 9 to be energized. This puts a low value of inductance in the welding circuit and results in good arc starting characteristics. The electrode 24 is advanced until the end thereof contacts the work 27. Upon the establishment of arc current flow, current relay 18 closes contacts 17, thereby energizing the timer 14 which after a predetermined time interval opens switch 12, thereby de-energizing coil 9 of relay 19 and opening contacts 8. Opening of contacts 8 puts the higher value of inductance from lead 5 into the weld circuit, and provides stable metal transfer during actual welding.

The timing interval of timer 14 can be adjusted by means 30 from zero to any preselected value depending only upon the selection of the timer interval. Current relay 18 and its contacts 17 may be replaced by a set of contacts in the power source master control circuit. Thus, upon energization of the power source 1, contacts 17 are closed immediately. Then, the timing circuit would automatically transfer the inductance in series with the arc circuit from the low value of lead 6 to the high value of lead 5 after a predetermined interval. This system thus provides optimum start conditions and optimum weld conditions. Variations of timing circuits can be employed without departing from the invention.

The following data represents an actual example of the invention.

| | |
|---|---|
| Electrode-wire | .035" dia. stainless steel (Linde 308L) 210 inches/minute. |
| Shielding gas (mixture) | 90% helium–7½% argon–2½% $CO_2$. |
| Welding: | |
| Current, amps | 120 D.C. |
| Potential, volts | 22½–23 v. |
| Work-plate | ⅛" 304 steel. |
| Torch tip to work distance | ⅜". |
| Start-inductance | 100 microhenries. |
| Weld-inductance | 450–500 microhenries. |
| Start-timer setting | 1 second. |

Timing bars of 0.1 second interval are shown as vertical lines 31, FIG. 2. Note the change in the percent of ripple 32 due to the added filtering action of the weld inductor value. The switching instant is shown as a dip 33 in the current trace 34, due to the current being diverted through the larger value of weld inductance.

It will be obvious to those skilled in the art that electrical circuits other than the one shown may be used to provide the same effects as series inductor switching circuit. The essential requirement of any such circuitry, however, is to provide a different rate of current rise (timer constant) for the starting and welding cycles. For example, the switch contacts 8 in FIG. 1 might be replaced by a large value of uncharged capacitance. During the charging period of the capacitor a relatively low value of inductance would be provided for starting, and upon completion of the charging period (end of starting interval) a relatively high value of inductance would be provided for welding.

What is claimed is:

1. An electric arc working system comprising the combination of means for feeding a consumable metal electrode toward a workpiece, and means for energizing a direct current arc between the end of such electrode and the workpiece in a series circuit, said means including an inductor in series circuit relation with such arc for normally stabilizing transfer of molten metal from the end of such electrode as the electrode is fed toward the workpiece, and a circuit connected to said inductor provided with means for selectively changing the inductance in the arc circuit from an optimum arc starting value to the metal transfer stabilizing value.

2. An electric arc working system comprising a direct current metal arc power supply circuit, auxiliary circuit means acting to control a timing interval in response to the flow of arc starting current in said circuit, and circuit means acting to change the current from an arc starting value of rate of current rise to a metal transfer value of rate of current rise upon completion of said timing interval, the duration of such interval being such that positive starting of the working arc is assured.

3. A direct current power supply system for work-in-circuit short-circuiting type consumable electrode gas-shielded metal transfer arc welding, provided with a welding circuit, an inductor in series therewith, and a timing circuit to operate a switch which selectively changes the series inductance of said inductor in the arc welding circuit from a relatively low value for good starting to a relatively high value for optimum metal transfer after a preset interval of time.

4. An electric arc welding system comprising the combination of means for feeding a consumable metal electrode toward a workpiece, and means for energizing a direct current arc between the end of such electrode and the workpiece in a welding circuit, said means including an inductor in series circuit relation with such arc for stabilizing transfer of molten metal from the end of such electrode as the electrode is fed toward the workpiece, a shunt circuit for said inductor provided with a switch for selectively changing the inductance in the arc circuit from a relatively low arc starting value to a relatively high metal transfer stabilizing value, an adjustable timing circuit for operating said switch, and means responsive to the flow of current in the arc welding circuit for initiating the operation of said timing circuit, which at the end of a preset duration of time causes such switch to so change such inductance value.

5. Work-in-circuit gas-shielded metal arc welding, which comprises starting the operation by feeding the end of a consumable wire electrode toward the work to be welded in a stream of selected gas, energizing such circuit with current flowing through an inductor having a preselected value of inductance for effecting good arc starting characteristics upon the resulting contact between such electrode and the work, starting a timing cycle in response to such current flow, and changing the inductance in such circuit upon completion of such circuit timing cycle to a value that results in better metal transfer characteristics in the resulting actual welding operation.

6. Work-in-circuit metal arc welding as defined by claim 5, in which such inductance is changed by first isolating and then switching a selected part of such inductor into such circuit.

References Cited by the Examiner
UNITED STATES PATENTS

| | | | |
|---|---|---|---|
| 2,066,123 | 12/1936 | Requa | 219—135 |
| 2,873,356 | 2/1959 | Carroll et al. | 219—131 |
| 3,054,884 | 9/1962 | Manz et al. | 219—131 |
| 3,078,362 | 2/1963 | Steinert | 219—135 |

RICHARD M. WOOD, *Primary Examiner.*